United States Patent
Greuel et al.

(10) Patent No.: US 9,975,788 B2
(45) Date of Patent: May 22, 2018

(54) OPTICAL FLUID TREATMENT DEVICE

(71) Applicant: PHILIPS LIGHTING HOLDING B.V., Eindhoven (NL)

(72) Inventors: Georg Greuel, Roetgen (DE); Sandeep Sangameswaran, Heverlee (BE)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 0 days. days.

(21) Appl. No.: 14/891,446

(22) PCT Filed: May 5, 2014

(86) PCT No.: PCT/EP2014/059028
§ 371 (c)(1),
(2) Date: Nov. 16, 2015

(87) PCT Pub. No.: WO2014/187657
PCT Pub. Date: Nov. 27, 2014

(65) Prior Publication Data
US 2016/0096748 A1    Apr. 7, 2016

(30) Foreign Application Priority Data
May 21, 2013   (EP) ..................... 13168493

(51) Int. Cl.
*C02F 1/32* (2006.01)

(52) U.S. Cl.
CPC ........ *C02F 1/325* (2013.01); *C02F 2201/009* (2013.01); *C02F 2201/322* (2013.01); *C02F 2201/326* (2013.01); *C02F 2201/3222* (2013.01); *C02F 2201/3228* (2013.01); *C02F 2303/04* (2013.01); *C02F 2303/14* (2013.01); *C02F 2307/10* (2013.01)

(58) Field of Classification Search
CPC ...... C02F 1/32; C02F 1/325; C02F 2201/322; C02F 2201/3222; C02F 2201/3225; C02F 2201/3227
See application file for complete search history.

(56) References Cited

U.S. PATENT DOCUMENTS

| 5,536,395 | A  | * | 7/1996 | Kuennen | ................. C02F 1/283 |
|           |    |   |        |         | 210/143 |
| 6,419,821 | B1 | * | 7/2002 | Gadgil  | ............... B01D 39/2068 |
|           |    |   |        |         | 210/109 |
| 7,641,790 | B2 | * | 1/2010 | Maiden  | ..................... A45F 3/20 |
|           |    |   |        |         | 210/241 |
| 7,887,223 | B2 |   | 2/2011 | Schiene |  |

(Continued)

FOREIGN PATENT DOCUMENTS

| DE | 4424256 A1 | 1/1996 |
| WO | 2009150582 A1 | 12/2009 |

(Continued)

*Primary Examiner* — Eliza Osenbaugh-Stewart

(57) ABSTRACT

An optical fluid treatment device comprising at least a holder provided with an aperture, a lamp device at least partly located in the aperture. The aperture comprises a fluid passage extending in a main fluid flow direction between a fluid inlet opening and a fluid outlet opening. The fluid passage extends at least partly along the lamp device, wherein the lamp device has an elongated shape extending substantially perpendicularly to the main fluid flow direction.

12 Claims, 3 Drawing Sheets

(56) References Cited

U.S. PATENT DOCUMENTS

| | | | |
|---|---|---|---|
| 2006/0163126 A1* | 7/2006 | Maiden | A45F 3/20 210/87 |
| 2007/0041268 A1* | 2/2007 | Beesley | A47J 43/0716 366/195 |
| 2010/0155339 A1* | 6/2010 | Gunter | C02F 1/325 210/739 |
| 2010/0264329 A1* | 10/2010 | Vardiel | C02F 1/325 250/436 |
| 2011/0038754 A1* | 2/2011 | James | C02F 1/325 422/24 |
| 2011/0100885 A1* | 5/2011 | Lee | B63J 4/002 210/85 |
| 2012/0237409 A1 | 9/2012 | Greuel | |
| 2015/0239751 A1* | 8/2015 | Lee | B08B 1/008 250/431 |

FOREIGN PATENT DOCUMENTS

| | | | |
|---|---|---|---|
| WO | 2010109389 | A1 | 9/2010 |
| WO | 2011115460 | A2 | 9/2011 |
| WO | 2012066440 | A1 | 5/2012 |

* cited by examiner

OPTICAL FLUID TREATMENT DEVICE

CROSS-REFERENCE TO PRIOR APPLICATIONS

This application is the U.S. National Phase application under 35 U.S.C. § 371 of International Application No. PCT/IE2014/059028, filed on May 5, 2014, which claims the benefit of European Patent Application No. 13168493.8, filed on May 21, 2013. These applications are hereby incorporated by reference herein.

FIELD OF THE INVENTION

The invention relates to
an optical fluid treatment device comprising a) a holder provided with an aperture extending between a fluid inlet opening and a fluid outlet opening in a main fluid flow direction, said aperture being at least a part of a fluid passage, b) a fluid container extending in the main fluid flow direction, which fluid container is provided with at least a fluid inlet and a fluid outlet, wherein the holder is mounted in the fluid container between the fluid inlet and the fluid outlet, and c) a lamp device which, during operation, emits UV-radiation into the fluid passage.

BACKGROUND OF THE INVENTION

Such optical fluid treatment device is known from the published patent document WO2012066440A1. More particularly, this document discloses an optical fluid treatment device comprising a fluid reservoir comprising a fluid compartment and a treatment compartment located at an upper part of the fluid reservoir. The treatment compartment houses a dielectric barrier discharge (DBD) lamp having a duct. A discharge opening of the fluid compartment adjoins an inlet opening of the duct, such that the duct is in fluid communication with the fluid compartment. When the fluid reservoir is handled by a user to pour fluid from it, the fluid reservoir will be tilted to cause fluid to flow from the fluid compartment through the duct to a jug discharge opening, and out of the fluid reservoir. When the fluid reservoir has been tilted, the DBD lamp is being activated to be operative, thereby generating light for treatment of fluid flowing in the duct. Such an optical fluid treatment device is being used for treatment of water.

The radiation is directed towards the inside of the duct having a relatively small diameter. Consequently, a relatively long duct is required to achieve minimum disinfection performance, thereby rendering the optical fluid treatment device less suitable for being used in relatively small fluid reservoirs. Another disadvantage of the known optical fluid treatment device is the difficulty for the end-user to visually detect fouling (such as inorganics, metals, bio-film etc) of the walls of the duct which necessitates expensive detection methods or may render the system unsafe after some time.

SUMMARY OF THE INVENTION

In view of the above-mentioned and other drawbacks of the prior art, a general object of the present invention is to provide an optical fluid treatment device for purification of a fluid, like drinking water, in a safe and simple manner, with a relatively compact holder.

According to a first aspect, the invention provides an optical fluid treatment device, wherein
a largest dimension of the lamp device is substantially perpendicular to the main fluid flow direction in the aperture.

In the main fluid flow direction, the dimension of, for example, an elongated lamp device is relatively small compared to the dimension of the lamp device in a direction extending parallel to the elongated lamp device. In this manner, also the holder can have a relatively small size in the main fluid flow direction. The elongated lamp device can be located in the centre of the aperture, wherein the fluid can flow along two longitudinal sides of the lamp device. Furthermore, a user can place his fingers on both longitudinal sides of the lamp device to be able to grasp the lamp device for removing it from the holder so that the lamp device can easily be replaced or cleaned.

Mounting the holder in a—preferably monolytic—fluid container is also advantageous. A user can fill the container through the fluid inlet with a fluid like water. The water will flow through the fluid passage in the aperture of the holder and along the lamp device. When switched on, the light emitted by the lamp device will purify the water. The purified water will leave the container through the fluid outlet. Said fluid container is preferably designed in a cylindrical shape.

According to a further aspect, the invention provides an optical fluid treatment device, wherein the holder is disc shaped, wherein the aperture extends substantially perpendicularly between two disc shaped outer surfaces of the holder.

Such a disc shaped holder is relatively compact and portable.

According to a further aspect, the invention provides an optical fluid treatment device, wherein the disc shaped holder comprises a number of compartments for housing at least a battery for powering the lamp device and electronics.

By powering the lamp device by means of a battery, the optical fluid treatment device is portable and can be used at any place. The electronics needed for operating the lamp device may comprise drive electronics for driving the lamp device, a high voltage transformer, a sensor for sensing the presence of a fluid, and/or a sensor for sensing the amount of UV radiation. Preferably, the elements are each stored in separate compartments, each compartment protecting and shielding the element located therein against the influence of the other elements.

An advantage of the separate compartments is relatively low cost for production and maintenance or repair of the electronics located in the compartments.

According to a further aspect, the invention provides an optical fluid treatment device, wherein the fluid container comprises removable covers at the fluid inlet and the fluid outlet.

Such a container can for example be a plastic bottle wherein the disc shaped holder is mounted in a sealed manner so that all water must flow from the fluid inlet through the fluid passage to the fluid outlet. The removable covers enable a user to fill the container, close the covers and open the covers at any time if he wants to drink water. Before he drinks the water, it will be purified by the light emitted by the lamp device. Bottles of optically transparent material have the advantage that the user can easily see the volume of water left in it.

According to a further aspect, the invention provides an optical fluid treatment device, wherein the optical fluid treatment device comprises at least a screen located in front of one of the openings at a predetermined distance therefrom.

The screen can be located in front of the fluid inlet opening, in front of the fluid outlet opening or in front of the fluid inlet opening as well as the fluid outlet opening.

The screen can have a number of functions which can be applied individually or simultaneously.

A first function of the screen is that the screen shields against direct exposure of the eyes to light emitted by the lamp device, when a person looks at the optical fluid treatment device from outside of the fluid passage. When the lamp device is, for example, a DBD lamp, UV light is emitted by the DBD lamp. The screen prevents in a simple manner that a person can look directly into the UV light. This is especially relevant in case that the container is made of an optically transparent material, like PE, PP or PET.

A second function of the screen is to restrict the amount of flow of fluid through the opening.

The size of the passage between the screen and the opening is determined by the size of the screen and the distance between the screen and the opening. The size of the passage between the screen and the opening can be dimensioned so that it is smaller than the size of the opening itself, thereby reducing the amount of flow through the opening. In this manner the amount of fluid flowing to the fluid passage can easily be adapted to the amount of light emitted by the lamp device so as to be able to guarantee a minimum dosage of for example UV light into the fluid. Furthermore, due to this reduced size of the passage between the screen and the opening, entry of unwanted relatively large objects into the fluid passage is also prevented.

If the screen is detachably connected to the holder, a third function of the screen is to allow access to the lamp device through the fluid inlet opening and/or a fluid outlet opening after removal of the screen. In this manner, the lamp device as well as the aperture can easily be cleaned and inspected.

A fourth function of the screen which is detachably connected to the holder is that by connecting the screen to the holder, a safety lock of the holder can be released, wherein only by releasing the safety lock the lamp device can be operated. Only if the screen is in position on the holder and opposite to the opening, the lamp device can be switched on. In this manner it is guaranteed that the screen in a simple manner prevents a person from looking directly into the light emitted by the lamp device and restricts the amount of flow through the opening to a desired amount of flow relating to a desired minimum UV dosage, for example.

According to a further aspect, the invention provides an optical fluid treatment device, wherein the lamp device is detachably connected to the holder.

After removal of the screen, the lamp device can be detached from the holder and be replaced in case that the lamp device is broken or that due to aging of the lamp device the amount of light emitted of the lamp device has decreased below a predefined threshold.

An embodiment of the optical fluid treatment device according to the invention is characterized in that the lamp device comprises UV-LEDs for emitting UV radiation. The small size of the UV-LEDs enables accommodation of said UV-LEDs at various locations in the fluid treatment device, and preferably said UV-LEDs are provided in at least one of the constituents of a group consisting of a wall of the aperture, a main surface of the screen(s), and the outer surfaces of the holder. The accommodation of the UV-LEDs in the screen(s) enables easy exchange or cleaning of said UV-LEDs by simple exchange of the screens or temporary removal of the screens. Preferably, the UV-LEDs are embedded in the wall, outer surface and/or screens in such a manner that they lie flush with the surface of said wall, outer surface and screen to enable easy cleaning.

BRIEF DESCRIPTION OF THE DRAWINGS

These and other aspects of the invention will now be described in more detail, with reference to the appended drawings showing currently preferred embodiments of the inventions, wherein.

DESCRIPTION OF PREFERRED EMBODIMENTS

Figure 1:
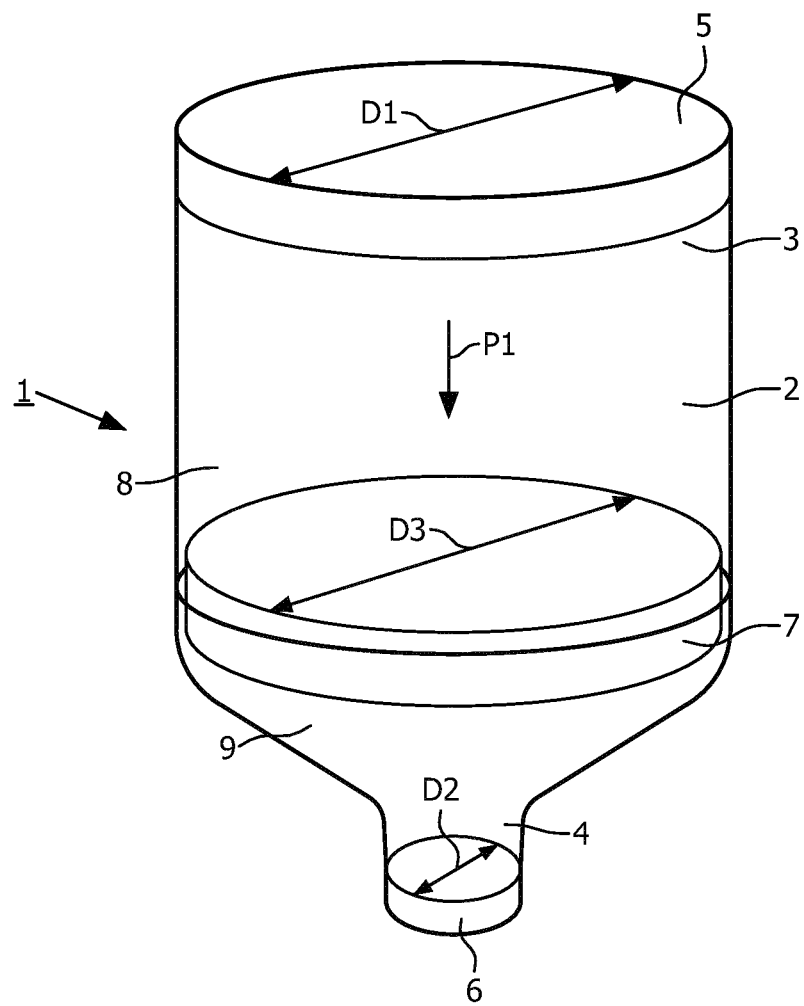
FIG. 1 shows a perspective view of an embodiment of an optical fluid treatment device according to the invention.
Figure 2A:
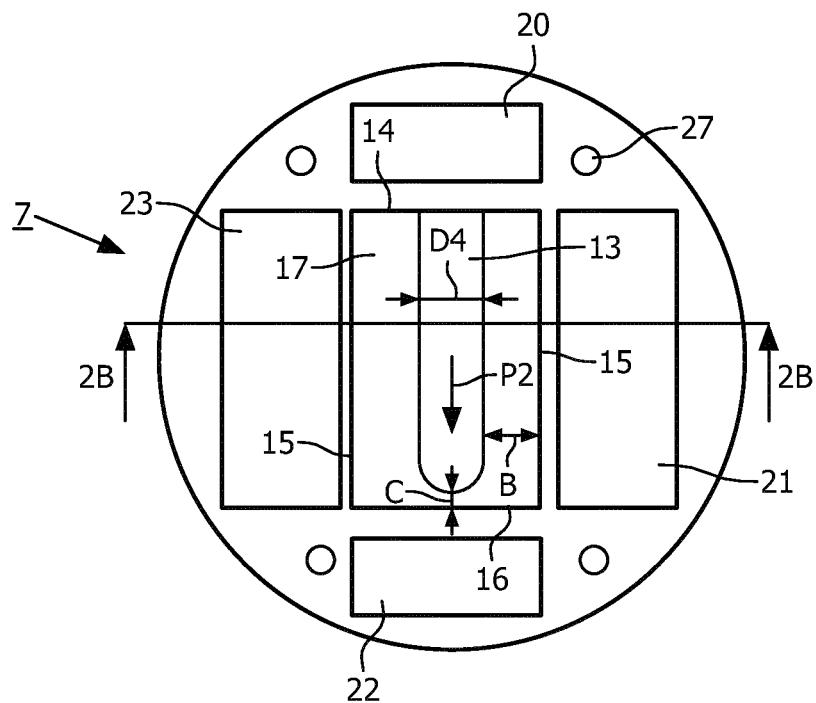
FIGS. 2A and 2B show a top cross section and a side cross section, respectively, of a holder of the optical fluid treatment device as shown in FIG. 1.
Figure 2B:
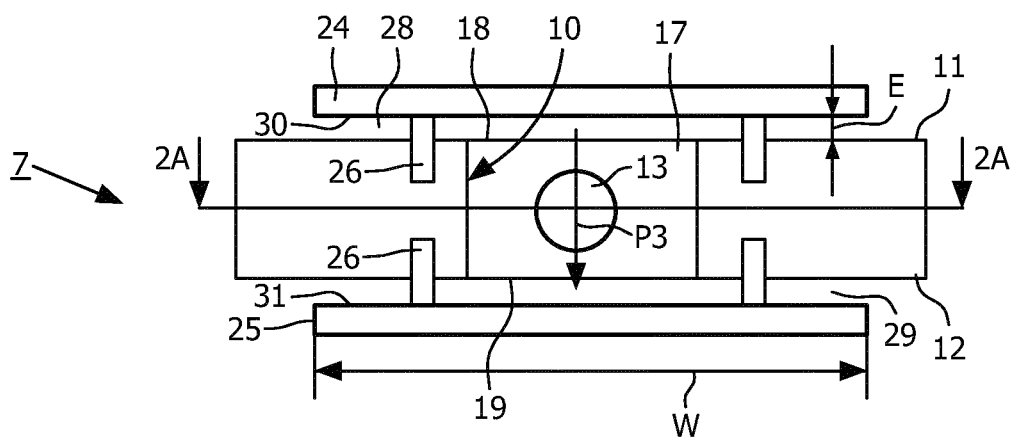

FIGS. 1-2B show different views of an optical fluid treatment device 1 according to the invention. The optical fluid treatment device 1 comprises a cylindrical fluid container 2 extending in a longitudinal direction P1. The cylindrical fluid container 2 is provided with a fluid inlet 3 and a fluid outlet 4. The fluid inlet 3 and the fluid outlet 4 each comprise a removable cover 5, 6. The cylindrical fluid container 2 has the shape of a bottle, wherein the diameter D1 of the fluid container 2 from the fluid inlet 3 to a position close to the fluid outlet 4 is relatively large, wherein near the fluid outlet 4 the cross section of the fluid container 2 gradually decreases to a much smaller diameter D2. In this manner, the cylindrical fluid container 2 can easily be filled with a fluid like water through the relatively large fluid inlet 3, whilst due to the relatively small diameter of the fluid outlet 4, the water will flow relatively slowly and in relatively small amounts out of the fluid outlet 4, after removal of the cover 6. The container may be manufactured of a plastic material, preferably being optically transparent, like PE, PP or PET.

Between the fluid inlet 3 and the fluid outlet 4, a disc shaped holder 7 is removably mounted in the cylindrical fluid container 2. The disc shaped holder 7 has a diameter D3 being about the same as the diameter D1 so that the holder 7 can be inserted into the cylindrical fluid container 2 dividing the inside of the cylindrical fluid container 2 into an upper part 8 located near the fluid inlet 3 and a lower part 9 located near the fluid outlet 4.

The disk-shaped holder 7 can be inserted into the cylindrical fluid container 2 and made to rest at a pre-determined position by means of sealing, a screw or pins or other fixing mechanism. The disk-shaped holder 7 can in turn be easily removed integrally from the cylindrical fluid container 2 for cleaning, replacement, maintenance etc.

As can be seen in FIGS. 2A-2B, the disc shaped holder 7 is provided with a rectangular aperture 10 located in the centre of the holder 7, which aperture 10 extends between two parallel, disc shaped outer surfaces 11, 12 of the holder in a main fluid flow direction extending parallel to the longitudinal direction P1. An elongated tubular lamp device 13 is located in the aperture 10 and removably connected in a wall 14 bounding the aperture 10. The elongated tubular lamp device 13 extends in a direction P2 perpendicular to the longitudinal direction P1. The lamp device 13 is preferably a DBD-lamp device. The diameter D4 of the tubular lamp device 13 is for example about 2 centimeters, wherein the distance B between the tubular lamp device 13 and longitudinal walls 15 bounding the aperture 10 and extending perpendicularly to the wall 14 is about 0.2 to 4 centimeters, most preferably 0.2 to 1 centimeter. The distance C between an end of the lamp device 13 and a wall 16 bounding the aperture 10 and extending parallel to the wall 14 is about 1 to 3 centimeters. The length of the lamp is between 3 and 15 centimeters, preferably between 7 and 10 centimeters. The inner diameter D3 of the container is between 8 and 20 centimeters, preferably between 8 and 15 centimeters. The space between the walls 14, 15, 16 bounding the aperture 10 and the lamp device 13 forms a fluid passage 17 extending in the main fluid flow direction P1 between a fluid inlet opening 18 and a fluid outlet opening 19.

The holder 7 is sealed, along its periphery, to the cylindrical fluid container 2, so that all fluid flowing from the upper part 8 to the lower part 9 needs to flow through the fluid passage 17.

The holder 7 comprises four compartments 20, 21, 22, 23 located between the disc shaped outer surfaces 11, 12 and each being located next to one of the four walls 14, 15, 16. The compartment 20 houses a high voltage transformer, the compartment 21 houses electronics, the compartment 22 houses a battery and the compartment 23 houses electronics for sensing and feeding back information to the electronics. The elements located in the four compartments are electrically connected to each other. The compartment 20 for the high voltage transformer comprises a metallic ground electrode being in contact with the fluid in the fluid container 2 and comprises a high voltage electrode which is in contact with a central high voltage electrode of the lamp. The high voltage electrode is sealed against the fluid by the lamp device 13 in combination with at least one O-ring. The compartment 22 for the battery comprises a sealed input for connection to a charging unit if rechargeable batteries are used, and a sealed cover for replacement of the batteries.

The optical fluid treatment device 1 comprises two rectangular screens 24, 25 with a width W located in front of the fluid inlet opening 18 and the fluid outlet opening 19 respectively at a predetermined distance E therefrom. The width W is larger than the total width D+2B of the aperture 10. The upper limit for W is given by the diameter D3 of the holder. The lower diameter is determined by the requirement that the lamp device 13 cannot be seen by the user, to guarantee safe usage.

Also the lateral dimensions of the screens 24, 25 must guarantee that the lamp device 13 is not visible to the user.

The screens 24, 25 are kept at the distance E from the disc shaped outer surfaces 11, 12 by means of three or four pins 26 located in holes 27 of the holder 7. The pins 26 keep the screens 24, 25 in place and guarantee a fixed distance E of screen 24, 25 to the holder 7. The distance E is between 0.1 and 1 centimeter. The holder 7 comprises a safety lock located in compartment 21, which safety lock is released by inserting the pins 26 of the screens 24, 25 into the holes 27, wherein only after releasing the safety lock the lamp device 13 can be operated. The size of the screens 24, 25 and the distance E is such that, viewed from outside of the fluid passage 17, the screens 24, 25 shield against direct exposure of the eyes to light emitted by the lamp device 13. Furthermore, the screens 24, 25 in combination with the distance E between screens 24, 25 and holder 7 restrict the amount of flow through the fluid inlet opening 18 and the fluid outlet opening 19, respectively.

Preferably, the holder 7 comprises a sensor for sensing that a fluid, for example water, is present in, or starts flowing through the fluid passage 17. As soon as the sensor is being activated, the lamp device 13 is switched on. Since the metallic ground electrode of the lamp device 13 is formed by the water being in contact with the lamp device 13, the discharge inside the lamp device 13 will be ignited over the wetted part of the surface area, provided the wetted part is in contact with a ground electrode of the holder 7.

To operate the optical fluid treatment device 1, for example for disinfection and/or purification of water, water is inserted through the fluid inlet 3 after the cover 5 has been removed. The water will flow in the main fluid flow direction towards the screen 24 and will be forced by the screen 24 to flow around it and into an opening 28 between the screen 24 and the disc shaped outer surface 11. The water will then flow through the fluid passage 17 and be subjected to the light emitted by the lamp device 13, due to which the fluid will be disinfected and/or purified. The disinfected and/or purified water will then flow out of the fluid passage 17, via an opening 29 between the screen 25 and the disc shaped outer surface 12, and into the lower part 9. In such an embodiment, the fluid passage 17 is considered to be formed by the aperture 10 and the openings 28, 29. After removal of the cover 6, the water will flow from the lower part 9, through the fluid outlet 4, out of the optical fluid treatment device 1.

The distances B, C and E are determined so that the fluid will flow at a rate through the fluid passage 17 such that it will be exposed long enough to the light emitted by the lamp device 13, due to which the fluid will be sufficiently disinfected and/or purified. The lamp device 13 comprises a DBD lamp. Light emitted by the lamp device 13 is ultraviolet C (UVC) with a wavelength between 100 and 280 nanometer. Typical UVC doses to be applied are between 20 and 60 mJ/cm$^2$, preferably 40 mJ/cm$^2$. The exact value of B, C and E depend on the lamp power, lamp geometry of the lamp device 13, and UV transmission of the fluid. The screens 24, 25 may be used to limit the fluid flow not only via the distance E to the holder 7, but also by shaping them in such a way that the opening 28, 29 is partly closed.

It is also possible that the holder 7 is not sealed in the fluid container and that its diameter is smaller than the dimensions of the container. If so, the fluid container 2 needs to be turned upside down to achieve complete irradiation of the stored water by intermixing due to turbulent movement.

As an alternative, the holder 7 may be placed on top of a liquid reservoir and move slowly downwards through the liquid, such as water, under the effect of gravity. During this movement the liquid passing along the lamp device 13 will be irradiated and disinfected. In this design, the average weight per volume of the holder shall be adjusted to be between 1 and 10% higher than the weight of the liquid to be treated, preferably 1 to 10% higher than the specific weight of the liquid.

Fouling detection can be easily achieved by simply taking off one of the shielding screens 24, 25 and visually verifying the state of cleanliness of the lamp device 13. In case of visible film formation, the user can take out the lamp device 13 and clean it with standard household cleaning agents (such as Citric Acid, Acetic Acid, polishing powders in emulsion etc.) and put the lamp device 13 back in place.

Instead of separate compartments 20-24, it is also possible to enclose all electronics in one compartment with the exception of the lamp device 13, which remains a separate removable entity. This option will reduce the number of seals, however at the expense of system maintainability and replaceability of the electronics.

It is also possible to use a number of disk-shaped holders in one cylindrical fluid container 2, wherein similar or different kinds of disk-shaped holders are stacked vertically in a desired sequence, if an end-user wants a disk-shaped holder 7 with a UV lamp device to be supplemented with disk-shaped holders 7 comprising other purifying mechanisms like a particle filter or active carbon membrane.

It is possible to replace the DBD lamp as UV radiation source by a Light Emitting Diode (LED) lamp or array of lamps. In the case of one or more LEDs or a combination of a DBD lamp with LEDs, the LEDs can be placed along the walls 14-16 of the aperture 10, for example in a (partially) circumferential manner around said aperture 10, or in at least one of the screens 24, 25, for example as a matrix of LEDs provided in a main surface 30, 31 of the screen(s) 24, 25 facing towards the aperture 10, or they can for example be provided in at least one of the outer surfaces 11, 12 of the holder 7 at a location directly opposite a respective one of the screens 24, 25. It applies to all embodiments that a user is protected from direct exposure to the light emitted by the lamp device when he looks at the optical fluid treatment device from outside of the fluid passage. The array of LEDs form a unit which is to be considered as a single lamp device which, during operation, radiates UV-radiation from the walls 14-16 and/or from the main surface(s) and/or from the outer surfaces 11, 12 into the fluid passage and/or opening(s) 28, 29.

Figure 3:
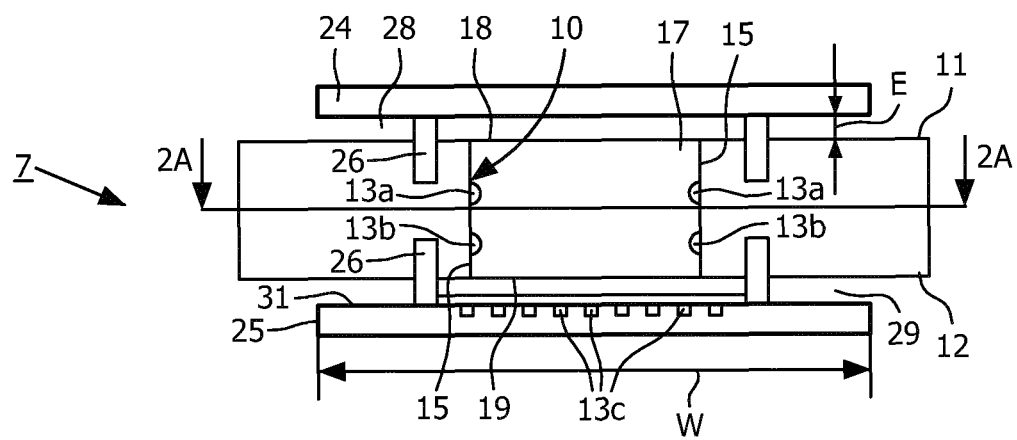
FIG. 3 shows a side cross section of a second embodiment of an optical fluid treatment device according to the invention.

The embodiment of the optical fluid treatment device 1 shown in FIG. 3 is similar to the optical fluid treatment device 1 shown in FIG. 2B, but this embodiment comprises three lamp devices 13a, 13b, 13c each comprising an array of UV-LEDs. The lamp devices 13a, 13b are mutually parallel arranged in a circumferential manner in the walls 15 of the aperture 10, and the lamp device 13c is provided in main surface 31 of screen 25 facing towards the aperture. Also in this embodiment, the pins 26 could function as electrical contact, for example to electrically connect the lamp device 13c to batteries accommodated in compartments 20-23 (see FIG. 2A). Alternatively or additionally, batteries could be accommodated in the screens 24, 25.

The fluid to be treated can be water or other kinds of liquids or gasses.

The person skilled in the art will realize that the present invention is by no means limited to the preferred embodiments. Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope of the claims.

LIST OF REFERENCE SIGNS 1 optical fluid treatment device
2 fluid container
3 fluid inlet
4 fluid outlet
5 removable cover
6 removable cover
7 holder
8 upper part
9 lower part
10 aperture
11 outer surfaces
12 outer surfaces
13 lamp device
13a,b,c lamp devices
14 wall
15 wall
16 wall
17 fluid passage
18 inlet opening
19 outlet opening
20 compartment
21 compartment
22 compartment
23 compartment
24 screen
25 screen
26 pins
27 holes
28 opening
29 opening
30 main surface
31 main surface
D1 diameter
D2 diameter
D3 diameter
D4 diameter
B distance
C distance
E distance
P1 direction
P2 direction
P3 direction

The invention claimed is:

1. Optical fluid treatment device comprising:
a portable disk-shaped holder provided with an aperture extending between a fluid inlet opening and a fluid outlet opening in a main fluid flow direction, said aperture being at least a part of a fluid passage, wherein the aperture contains a lamp device,
a single fluid container extending in the main fluid flow direction, which fluid container is provided with at least a fluid inlet and a fluid outlet, wherein the holder is mounted in the fluid container between the fluid inlet and the fluid outlet,
wherein, during operation, the lamp device emits UV-radiation into the fluid passage, wherein a largest dimension of the lamp device is substantially perpendicular to the main fluid flow direction in the aperture,
wherein the portable disk-shaped holder is inserted into the single fluid container at a pre-determined position forming a sealed periphery in the single fluid container so that all the flow from an upper fluid reservoir to a lower fluid reservoirs is through the aperture in the portable disk-shaped holder and
wherein the disc shaped-holder comprises a number of compartments for housing at least a battery for powering the lamp device and electronics.

2. Optical fluid treatment device according to claim 1, wherein the fluid container is cylindrical.

3. Optical fluid treatment device according to claim 1, wherein the aperture extends substantially perpendicularly between two disc shaped outer surfaces of the holder.

4. Optical fluid treatment device according to claim 1, wherein the fluid container comprises removable covers at the fluid inlet and the fluid outlet.

5. Optical fluid treatment device according to claim 1, wherein the optical fluid treatment device comprises at least a screen located in front of one of the openings) at a predetermined distance E therefrom.

6. Optical fluid treatment device according to claim 5, wherein the optical fluid treatment device comprises at least two screens, one screen opposite the fluid inlet opening and one screen opposite the fluid outlet opening.

7. Optical fluid treatment device according to claim 5, wherein the screen shields against direct exposure of the eyes to light emitted by the lamp device.

8. Optical fluid treatment device according to claim 5, wherein the screen restricts the amount of flow through the opening.

9. Optical fluid treatment device according to claim 5, wherein the screen is detachably connected to the holder.

10. Optical fluid treatment device (1) according to claim 5, wherein the holder comprises a safety lock, which safety lock is releasable by connecting the screen to the holder, wherein only by releasing the safety lock the lamp device can be operated.

11. Optical fluid treatment device according to claim 1, wherein the lamp device comprises a dielectric barrier discharge lamp and/or UV-LEDs for emitting UV radiation.

12. Optical fluid treatment device (1) according to 11, wherein the lamp device comprises UV-LEDs for emitting UV radiation, said UV-LEDs being provided in at least one constituent of the group consisting of a wall of the aperture (10), a main surface, and the outer surfaces of the holder.

\* \* \* \* \*